United States Patent
Morgan et al.

(10) Patent No.: US 6,802,519 B2
(45) Date of Patent: Oct. 12, 2004

(54) STEERING DAMPER

(75) Inventors: Jason J. Morgan, Lake Havasu City, AZ (US); Sonny J. Morgan, Lake Havasu City, AZ (US); Gene M. Bronsart, Lake Havasu City, AZ (US); Jay D. Morgan, Lake Havasu City, AZ (US)

(73) Assignee: RTT Motorsports, LLC, Lake Havasu City, AZ (US)

( * ) Notice: Subject to any disclaimer, the term of this patent is extended or adjusted under 35 U.S.C. 154(b) by 17 days.

(21) Appl. No.: 10/237,923

(22) Filed: Sep. 9, 2002

(65) Prior Publication Data

US 2004/0046351 A1 Mar. 11, 2004

(51) Int. Cl.[7] .................................................. B62K 21/08
(52) U.S. Cl. .......................................................... 280/272
(58) Field of Search ........................... 188/266.1, 266.2, 188/281, 284, 290, 306, 308, 310; 280/271, 272, 270, 276

(56) References Cited

U.S. PATENT DOCUMENTS

| | | | | |
|---|---|---|---|---|
| 4,566,712 A | * | 1/1986 | Motrenec | 280/272 |
| 4,736,962 A | * | 4/1988 | Motrenec | 280/272 |
| 4,773,514 A | | 9/1988 | Gustafsson | 188/306 |
| 5,492,033 A | * | 2/1996 | Hopey | 74/551.1 |
| 5,516,133 A | | 5/1996 | Motrenec et al. | 280/272 |
| 5,836,213 A | * | 11/1998 | Hopey | 74/551.2 |
| 5,927,740 A | * | 7/1999 | Hopey | 280/272 |
| 5,967,538 A | * | 10/1999 | Callaluca et al. | 280/279 |
| 6,145,637 A | * | 11/2000 | Hopey | 188/306 |
| 6,390,255 B2 | * | 5/2002 | Kobori et al. | 188/290 |
| 6,401,884 B2 | * | 6/2002 | Norman et al. | 188/310 |
| 6,471,229 B2 | * | 10/2002 | Stewart | 280/272 |

* cited by examiner

Primary Examiner—Lesley D. Morris
Assistant Examiner—Paul Royal, Jr.
(74) Attorney, Agent, or Firm—Cahill, von Hellens & Glazer P.L.C.

(57) ABSTRACT

A hydraulic damper for the steering assembly of a cycle is provided with several circuits by which the resistance to fluid flow and hence the damping afforded by the damper can be adjusted. Two of the circuits have manually adjusted progressive valves therein, one of which is positioned adjacent a hand grip on the handlebar. Another circuit provides progressive reduction in damping when the steering assembly is moved toward a fully turned position. And a further circuit reduces damping as the assembly is turned toward neutral. Major damper components are preferably associated with the tube clamp of the steering assembly.

20 Claims, 4 Drawing Sheets

STEERING DAMPER

TECHNICAL FIELD

This invention is concerned with damping the steering movements of the steering assembly of a cycle, especially a motorcycle.

BACKGROUND ART

The desirability of damping the motion of the steering wheel assembly of a motorcycle has long been recognized whether to resist wobbling of the assembly at high speeds or to absorb sidewise shocks to the assembly when traversing rough terrain.

U.S. Pat. No. 4,773,514 granted Sep. 27, 1988 to Leif Gustafsson for "Hydraulic Damping Device" discloses a device for attachment to the steering assembly of a motorcycle. Damping is achieved by movement of a piston wing through a body of hydraulic fluid in a sector shaped chamber. The device includes means for adjusting the resistance to movement of the piston wing and the range of movement throughout which the resistance is effective. The resistance adjustment is made by manually turning a knob on the device requiring the rider to let go of the handlebar to make the adjustment. The range adjustment is made with a screwdriver and can be made only when the cycle is stopped.

U.S. Pat. No. 5,516,133 granted May 14, 1996 to D. L. Motrenec et al. for "Steering Stabilizer for Bicycles" discloses a device which dampens hydraulically. A valve in the hydraulic circuit controls the resistance to flow of hydraulic fluid and is remotely manually manipulated by a lever positioned near the hand grip on the handlebar. The valve provides three distinct levels of resistance. Unfortunately, the valve design blocks fluid flow completely as it is moved from one resistance level to another which momentarily locks the steering mechanism.

There continues to be a need for a reliable hydraulic damping system which can be easily and safely manipulated by the cycle rider while the cycle is in motion.

SUMMARY OF THE INVENTION

This invention contemplates providing a hydraulic damper in which a paddle is positioned in and relatively movable with respect to an arcuate chamber filled with hydraulic fluid such as oil. Two hydraulic circuits provide for the flow of fluid from one side of the chamber to the other side of the chamber when there is relative movement between the paddle and the chamber. Each hydraulic circuit has a progressive valve therein for adjusting the resistance to fluid flow through its circuit. At least one of the valves is positioned adjacent a hand grip on the cycle handle bars for convenient manipulation by the cycle rider.

In accordance with the invention the chamber of the damper is preferably formed in the triple clamp which is the top member of the steering wheel fork suspension of the cycle. A cover for the chamber has portions of the fluid circuit ports and passages formed therein thereby forming a compact assembly positioned beneath the handlebars.

A further feature of the invention is the provision of fluid bypass grooves in a wall of the chamber preferably the wall formed by the cover. The grooves extend from a central region of the chamber outwardly in opposite directions toward the end regions of the chamber. The flow volume of each groove becomes progressively larger toward the end region of the chamber. These grooves allow increased flow of fluid past the paddle near the end of its relative motion to reduce the damping.

A still further feature of the invention is a further bypass fluid circuit connecting opposite sides of the chamber. This circuit has valve means therein which allow free flow of fluid between the sides of the chamber when the relative motion of the paddle is toward its central, or neutral, position.

BRIEF DESCRIPTION OF THE DRAWINGS

The invention is described in greater detail hereafter by reference to the accompanying drawings wherein:

FIG. 4 is a bottom view of the cover component of FIG. 3;

BEST MODES FOR CARRYING OUT THE INVENTION

Figure 1:
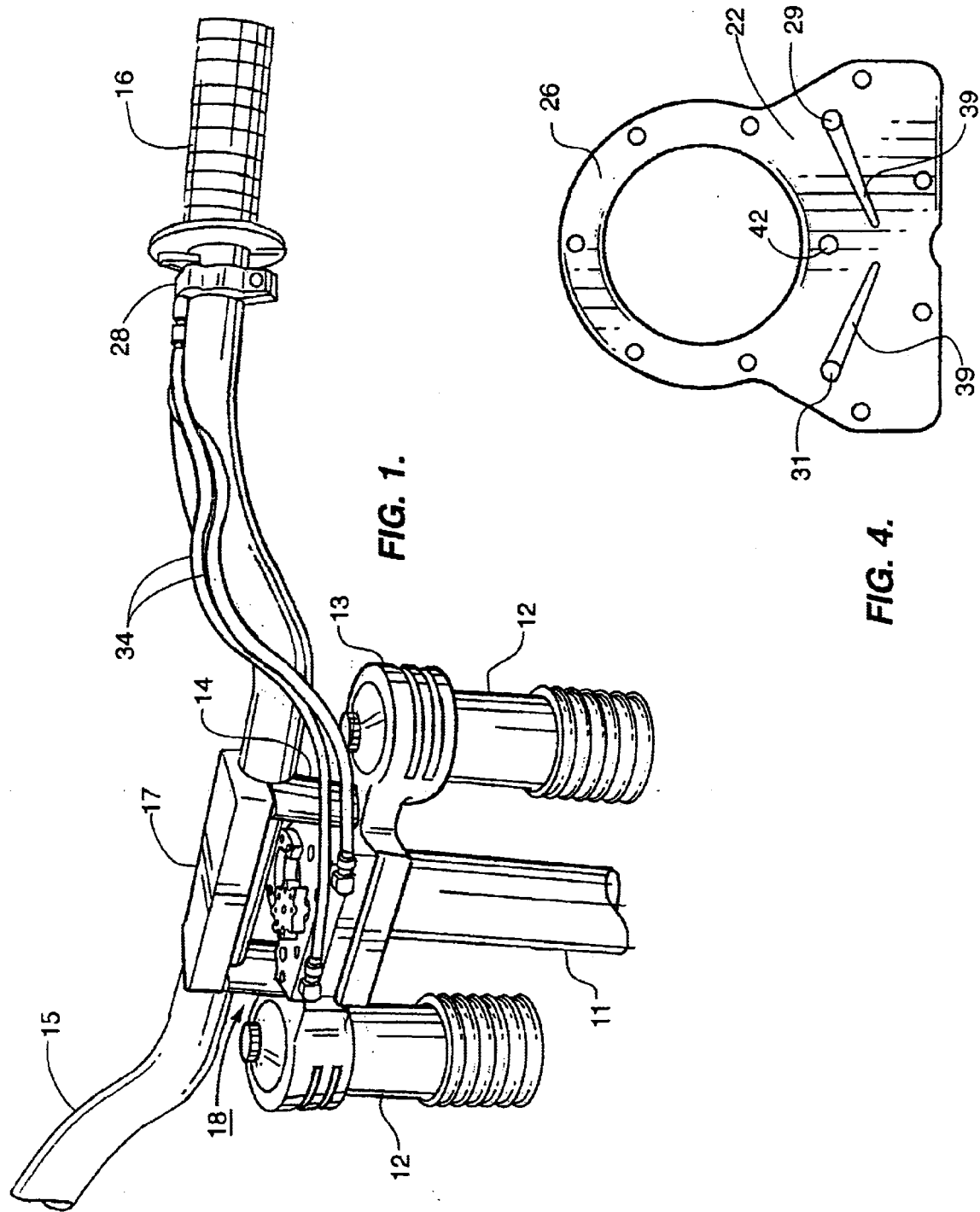
FIG. 1 is a fragmentary perspective view of the suspension and steering systems for the front wheel of a motorcycle having the damper of this invention incorporated therein.

Referring to FIG. 1 which illustrates the suspension and steering assembly of a motorcycle wherein the reference numeral 11 designates the front tube of the cycle frame in which the assembly is pivotally carried. Other components of the assembly include fork tubes 12 having their upper ends clamped in a fork clamp 13.

Mounted above the fork clamp 13 on riser posts 14 is the handlebar 15 which has hand grips 16 at the ends thereof only one of which is shown in FIG. 1. Handlebar 15 is held in place on the riser posts 14 by a clamp plate 17. Movement of the handlebar 15 is transmitted to steering wheel of the cycle through the fork clamp 13 and the fork tubes 12. Conversely, wobble motion of the steering wheel and sidewise jars, or shocks, to the wheel by rough terrain are transmitted back to the handlebar 15 via the fork tubes 12 and the fork clamp 13. These forces can cause the rider to lose control of the cycle.

In order to prevent this undesirable consequence it is desirable to dampen steering motion of the wheel assembly. In accordance with the invention this is accomplished by a damper, indicated generally by reference numeral 18, which is associated with the fork clamp 13.

Figure 2:
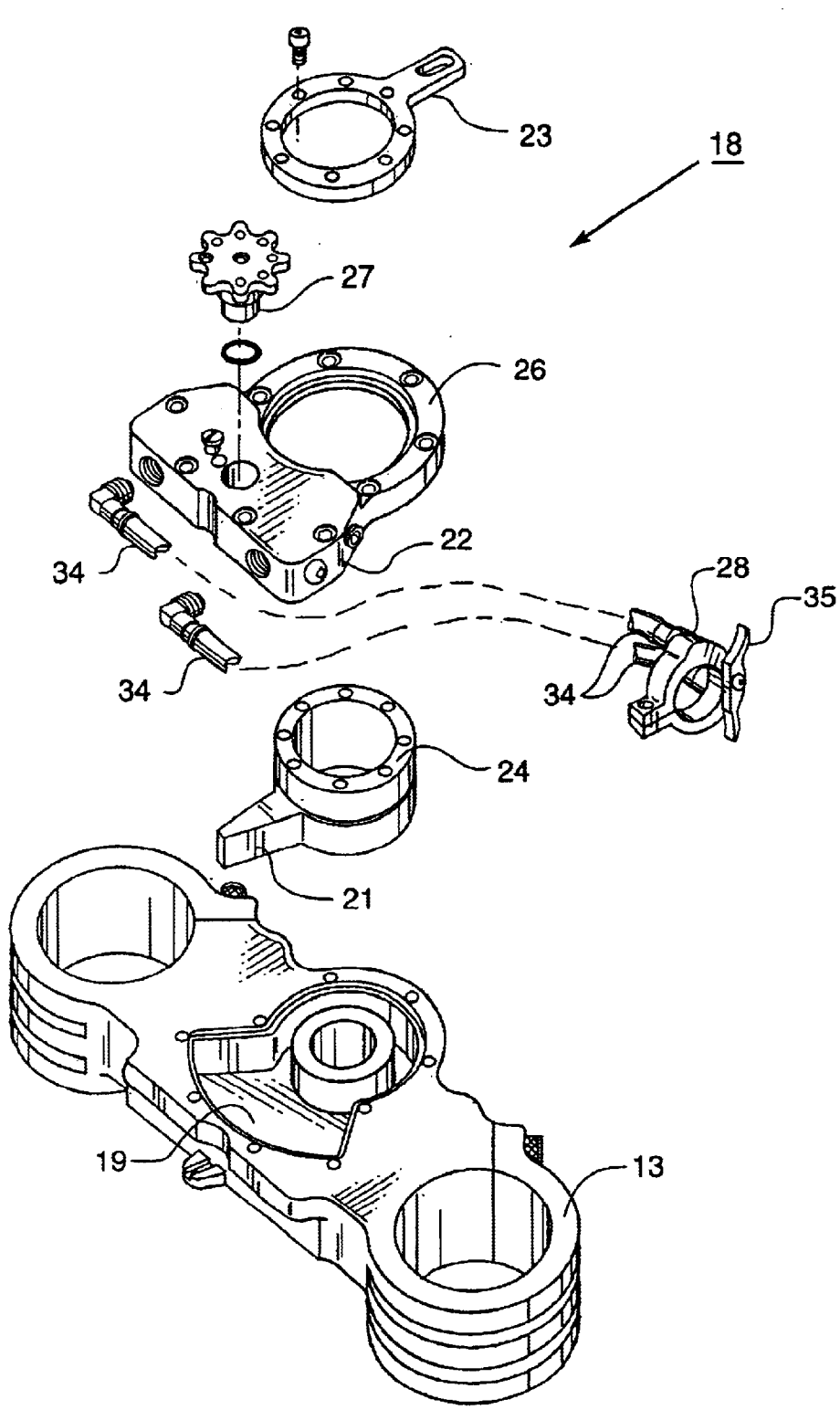
FIG. 2 is an exploded perspective view of the damper of this invention.

The principal components of the damper 18 are shown in FIG. 2 and include an arcuate hydraulic chamber 19 formed in fork clamp 13 and adapted to be filled with a hydraulic fluid, preferably oil. Positioned within chamber 19 is a paddle, or vane, 21. The chamber 19 and paddle 21 are covered by a cover member 22 which is bolted in place on the fork clamp 13 and forms the top wall of chamber 19.

Control of paddle 21 is effected by a control arm 23 which is bolted to a cylindrical hub 24 of paddle 21 which extends upwardly through sealing ring portion 26 of cover 22.

In the arrangement illustrated the control arm 23 is affixed to a portion of the frame of the cycle to maintain the paddle 21 stationary when the steering wheel is turned thus creating relative motion between the paddle 21 and the chamber 19. Damping of movement of the steering assembly is accomplished by resisting flow of hydraulic fluid from one side of the paddle 21 to the opposite side of the paddle, i.e., from one side of chamber 19 to the other side of chamber 19. In accordance with this invention several hydraulic circuits, portions or all of which are formed in cover member 22, are provided in the damper for adjusting or altering the resistance to that fluid flow.

Manual adjustment of resistance to fluid flow through a first circuit is effected by a manually manipulated progressive valve 27 mounted in cover member 22.

Manual adjustment of resistance to fluid flow through a second circuit is effected by a manually manipulated progressive valve 28 positioned near a hand grip 16 on the handlebar 15.

Communication with the two sides of chamber 19 is provided by a pair of ports 29 and 31 drilled in the lower face of cover member 22 (See FIG. 4). These ports allow for flow of hydraulic fluid in and out of chamber 19 through each of the hydraulic circuits provided in the damper.

Figure 3:
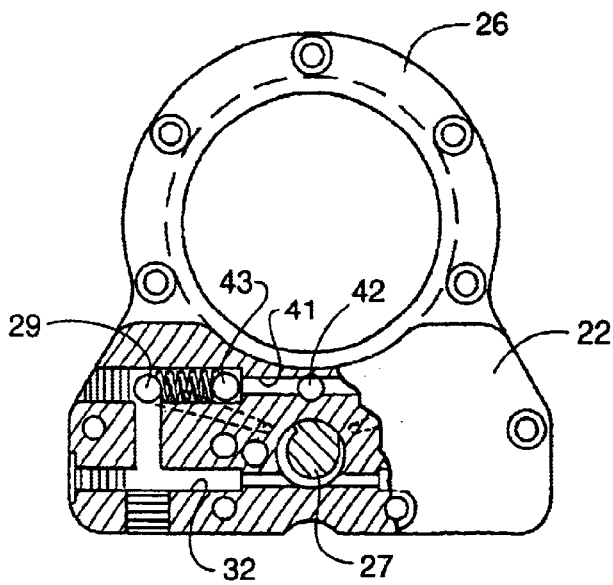
FIG. 3 is a top plan view of a cover component of the damper with portions broken away to show hydraulic circuits therein.
Figure 5:
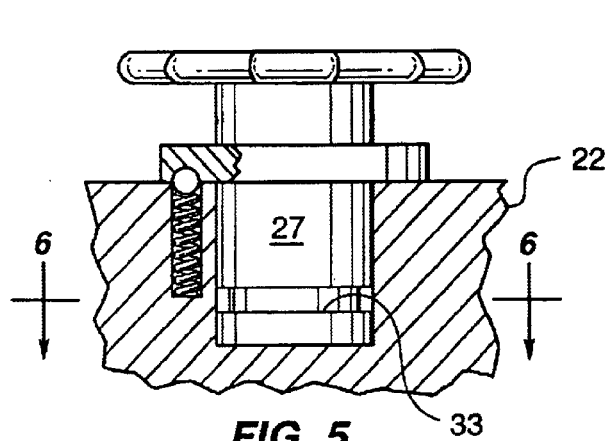
FIG. 5 is a sectional view of a portion of the cover component showing a valve in one of the hydraulic circuits in the cover.
Figure 6:
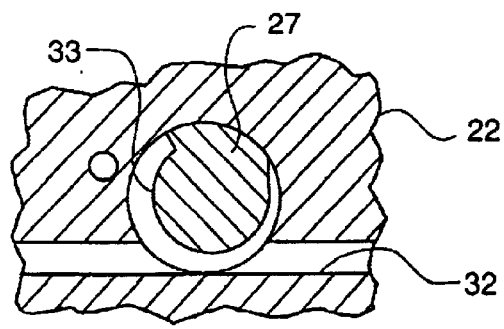
FIG. 6 is a sectional view of the valve of FIG. 5 taken as indicated by line 6—6 in FIG. 5.

The first such circuit includes a passageway 32 communicating at its ends with ports 29 and 31 and having valve 27 midway between the ports (See FIGS. 3, 5 and 6). The body of valve 27 has a peripheral groove 33 therein that varies in flow area progressively throughout its length. Groove 33 permits fluid to flow through passage 32 in the first circuit. By turning valve 27 the resistance to flow through passageway 32 can be adjusted with the larger section of groove 33 offering less resistance and less damping than the smaller sections of the groove. The adjustment is "progressive" in that no flow stoppage occurs between different positions of the valve.

Figure 7:
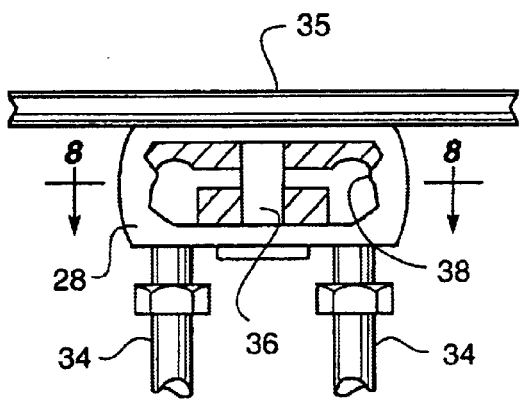
FIG. 7 is a side view of a valve employed in another hydraulic circuit of the damper with portions broken away to show the passages therein.
Figure 8:
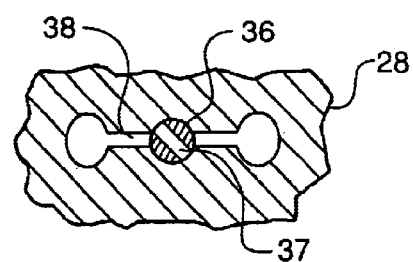
FIG. 8 is a sectional view of the valve of FIG. 7 taken as indicated by line 8—8 in FIG. 7.

A second hydraulic circuit communicating with ports 29 and 31 is provided by hoses 34 communicating with cover member 22 and progressive valve 28. The construction of valve 28 is illustrated in FIGS. 7 and 8 and comprises a thumb or finger handle 35 for turning a stem 36 having a bore 37 therethrough for selectively adjusting the resistance to fluid flow through a passage 38 in the body of valve 28 which connects the hoses 34. The stem 36 of valve 28 can be turned from closed to full open of passage 38 to reduce resistance to fluid flow and reduce dampening. Convenient location of this valve 28 near the handle grip 16 permits the rider to safely adjust damping of the steering while moving.

Two other automatic fluid flow control features are preferably incorporated into the damper 18. The first of these is a provision for reducing the damping effect the further the steering assembly is moved away from center for ease of steering. This is provided by two grooves 39 in the bottom face of cover member 22 (See FIG. 4). These grooves grow progressively larger in flow area from the central region of chamber 19 toward its ends. The grooves allow progressively larger volumes of fluid to flow around the paddle 21 thereby reducing the overall resistance to flow of fluid from one side of the paddle to the other as the paddle 21 approaches an end of chamber 19.

The last fluid flow circuit in the cover member 22 significantly reduces the resistance to fluid flow when the relative movement of the paddle 21 is toward the center or neutral position in the chamber 19. This circuit includes a passage 41 in communication at its ends with ports 29 and 31 and with an intake port 42 therebetween. Valve means in the form of opposite check valves 43 in passage 41 permit fluid to flow freely into intake port 42 and through passage 41 from one side of the paddle 21 to the other side when the relative motion of the paddle is toward the center position.

Figure 9:
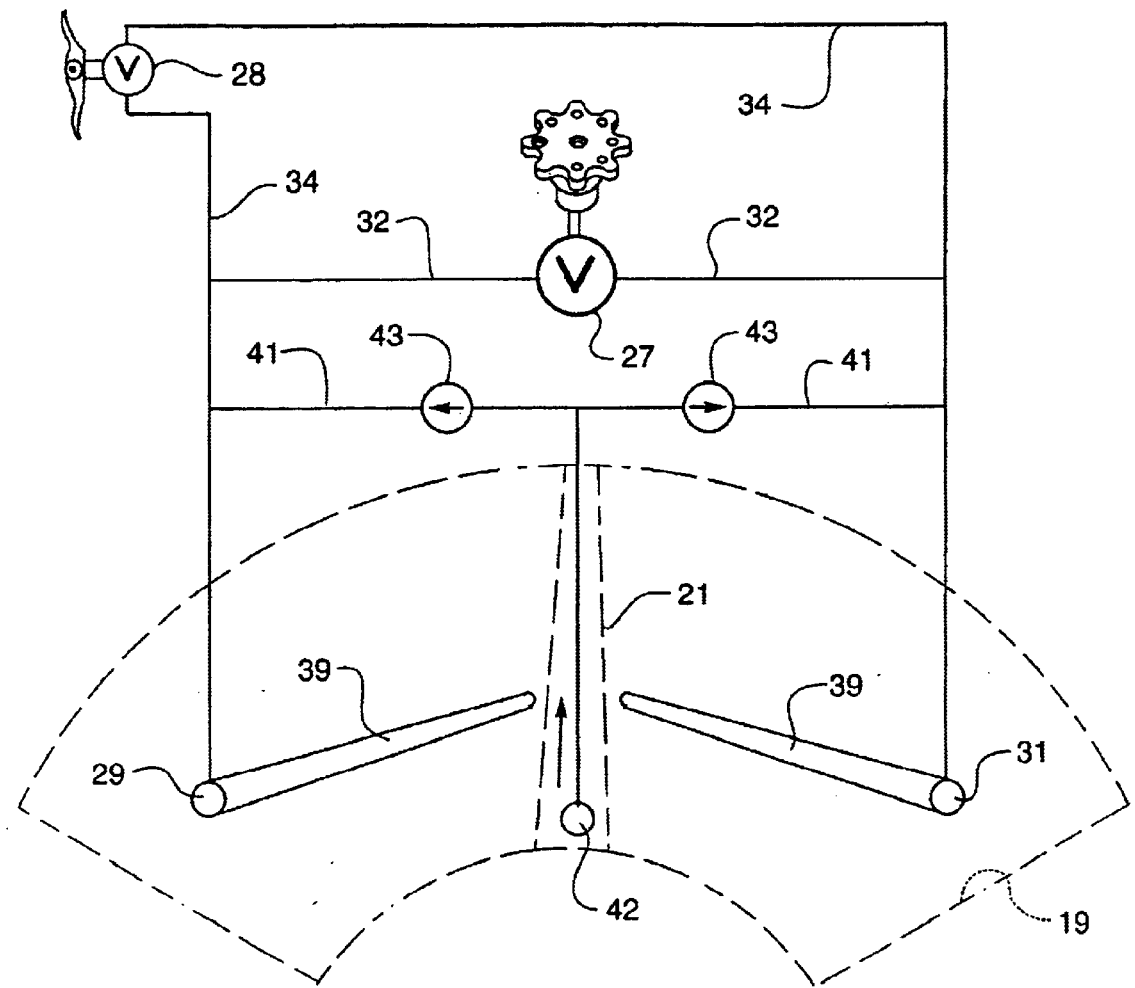
FIG. 9 is a schematic of the fluid circuits and flow paths of the damper.

The several circuits for fluid flow in the damper are illustrated schematically in FIG. 9 wherein the components are identified by the same reference numerals used above.

What is claimed is:

1. A cycle steering wheel damper comprising an arcuate chamber with hydraulic fluid therein, a paddle in said chamber dividing the chamber into two sections, one on either side of the paddle, the damper being mounted on the cycle in a manner that produces relative movement between the chamber and the paddle when the wheel of the cycle is turned, a first hydraulic circuit from one side of the chamber to the other side of the chamber, a first valve in said first hydraulic circuit for adjusting the resistance to the flow of hydraulic fluid through the first circuit, a second hydraulic circuit from one side of the chamber to the other side of the chamber and a second valve in said second hydraulic circuit for adjusting the resistance to the flow of hydraulic fluid through the second circuit, said second valve being positioned remote from structure defining said chamber.

2. The steering damper of claim 1 wherein said second valve is adapted to be positioned adjacent an operator hand grip on the cycle.

3. The steering wheel damper of claim 1 wherein one wall of structure defining said chamber has a groove therein in each of the two sections of the chamber permitting passage of hydraulic fluid past said paddle when there is relative movement of the paddle with respect to the chamber.

4. The steering wheel damper of claim 3 wherein said grooves become progressively larger away from a central region of the chamber.

5. The steering wheel damper of claim 1 further comprising a third hydraulic circuit having a check valve means therein allowing flow of hydraulic fluid therethrough only when the relative movement between the paddle and the chamber is with the paddle moving toward a central region of the chamber.

6. The wheel damper of claim 1 wherein the said chamber is formed in a wheel fork clamp for the cycle.

7. The wheel damper of claim 6 further comprising a cover for the chamber in the fork clamp and at least a portion of the first and second hydraulic circuits formed in said cover.

8. A cycle steering wheel damper comprising a steering wheel, a fork clamp for the steering wheel, said fork clamp having a hydraulic chamber formed therein with hydraulic fluid in the chamber, a paddle in said chamber, and means for connecting the paddle to the frame of the cycle.

9. The steering wheel damper of claim 8 further comprising a hydraulic circuit allowing for flow of hydraulic fluid in the chamber from one side of the paddle to the other side of the paddle, and a valve in said circuit for adjusting the resistance to the flow of hydraulic fluid through the circuit.

10. The steering wheel damper of claim 9 wherein said valve is adapted to be positioned adjacent an operator hand grip on the cycle.

11. The steering wheel damper of claim 9 further comprising a cover for the chamber in the fork clamp, at least a portion of the said hydraulic circuit being formed in said cover.

12. The steering wheel damper of claim 8 further comprising a cover for the chamber in said fork clamp, said cover having a pair of opposing grooves therein extending outwardly of the central region of the chamber allowing hydraulic fluid to flow around the paddle as it moves in the chamber.

13. The steering wheel damper of claim 12 wherein said grooves become progressively larger away from the central region of the chamber.

14. The cycle steering wheel damper of claim 1 wherein said first and second valves are progressive valves.

15. The cycle steering wheel damper of claim 9 wherein said valve is a progressive valve.

16. The cycle steering wheel damper of claim 10 wherein said valve is a progressive valve.

17. The steering wheel damper of claim 8 further comprising a hydraulic circuit allowing for flow of hydraulic fluid from one side of the paddle to the other side of the paddle, said circuit having check valve means therein allowing flow of hydraulic fluid therethrough only when the paddle is moving toward a central region of the chamber.

18. The steering wheel damper of claim 9 further comprising another hydraulic circuit allowing for flow of hydraulic fluid from one side of the paddle to the other side of the paddle, said other circuit having check valve means therein allowing flow of hydraulic fluid therethrough only when the paddle is moving toward a central region of the chamber.

19. The steering wheel damper of claim 10 further comprising another hydraulic circuit allowing for flow of hydraulic fluid from one side of the paddle to the other side of the paddle, said other circuit having check valve means therein allowing flow of hydraulic fluid therethrough only when the paddle is moving toward a central region of the chamber.

20. The steering wheel damper of claim 11 further comprising another hydraulic circuit formed in said cover allowing for flow of hydraulic fluid from one side of the paddle to the other side of the paddle, said other circuit having check valve means therein allowing flow of hydraulic fluid therethrough only when the paddle is moving toward a central region of the chamber.

* * * * *